United States Patent [19]

Hendrick

[11] Patent Number: 5,025,833
[45] Date of Patent: Jun. 25, 1991

[54] DISK VALVE
[75] Inventor: Fred W. Hendrick, Cerritos, Calif.
[73] Assignee: Automatic Control Components, Inc., Denver, Colo.
[21] Appl. No.: 264,855
[22] Filed: Oct. 31, 1988
[51] Int. Cl.[5] .............................................. F16K 3/00
[52] U.S. Cl. .................................. 137/625.31; 251/118
[58] Field of Search ................... 251/118, 208, 304; 137/625.31

[56] References Cited
U.S. PATENT DOCUMENTS 3,207,181 9/1965 Willis .............................. 137/625.31
4,098,294 7/1978 Woods ....................... 137/625.31 X
4,461,316 7/1984 Cove et al. ..................... 137/557 X
4,603,834 8/1986 Hendrick .................... 137/625.31 X Primary Examiner—John Fox
Attorney, Agent, or Firm—Clifford A. Poff

[57] ABSTRACT

A disk valve construction having a unitary valve body formed with an internal cavity to receive therein a rotor spool passed through the fluid inlet end of the valve body. A replaceable sleeve member at an outlet chamber of the valve includes a truncated conical portion followed by a cylindrical portion of the fluid discharge end of the sleeve. The sleeve member is maintained in position by way of pressure of the fluid.

10 Claims, 3 Drawing Sheets

DISK VALVE

BACKGROUND OF THE INVENTION

1. Field of the Invention

The present invention relates to a valve having relatively movable disk members each with a fluid opening which can be brought into and out of fluid conducting alignment for discharging fluid to a discharge port, and, more particularly, to improvements to such a valve which include an unitary valve body having an internal cavity for receiving the disks and a rotor member by passage through inlet opening for operative positioning in the internal cavity in the valve body.

2. Description of the Prior Art

This invention relates to a valve having a stationary disk and a rotatable disk mounted in a valve housing in a face-to-face confronting relationship in a pathway for fluid in a valve body. The disks are each provided with at least one orifice or opening to control the flow of fluid through the valve by the size of the holes in the disk as well as the degree of alignment between the holes in the disk. Angular movement of one disk relative to the other in the valve body is accomplished by turning a handle situated outside of the valve body but coupled to produce rotation of the rotatable disk. The rotatable disk can be moved from a full open position wherein the hole or holes in one disk align with the hole or holes in the other disk for providing maximum flow through the valve to a fully closed position wherein the hole or holes in the respective disks are misaligned and blocked by solid portions of the confronting disks.

It is well known in the art to construct the valve body for such a valve as an assembly of two valve body parts. The valve body parts are provided with flanges which are bolted together. The parting line between the valve body parts no matter where it is located, must always be joined and sealed, in a fluid tight manner. When assembling the valve, the rotor spool is placed in the internal passageway of the upstream body part and seated against a protruding annular wall which forms the terminal portion of the inlet chamber and prevents dislodgment of the rotor spool into the inlet chamber. The multiplicity of parts necessated by the two part valve body complicates the fluid seal requirement for the valve and increased costs.

Valves of this type are particularly useful for controlling the flow of fluids from oil and gas wells and the like. Such a valve is sometimes called a choke when used to control the rate of flow of well production fluids that may contain abrasive containments such as sand particles. The fluid entering the valve may be under extreme pressure of the order of, for example, 3000 PSI. The openings in the disks are of a smaller cross-sectional area than either an upstream entry chamber or a downstream discharge chamber that are formed in a valve body. The openings in the disks cause an acceleration of the fluid passing through the openings in the disk. Therefore, the fluid emerging from the opening in the downstream disk enters a discharge chamber at an increased velocity which has a cross-sectional area that is greater than the cross-sectional area of the openings in the disk, but because of the construction of the discharge chamber, particularly when formed by a renewable sleeve in the valve body, a large pressure drop in the fluid passing through the sleeve is created. The effect is to reduce the capacity of the valve, and, because of the construction of the removable sleeve, abrupt changes to the configuration of the opening in the sleeve produce turbulence in the fluid, particularly at the outlet of the valve which is unprotected by the renewable sleeve.

In the known form of valves of the type under discussion, the outlet is defined by an oblong transverse configuration immediately downstream of the downstream disk. The oblong configuration is a result of the need to provide openings to receive retainer pins which are used to anchor the disk in the valve body. The area of the oblong configuration is reduced by the thickness of the sleeve when such a protective sleeve is required for the outlet chamber. The reduced oblong area of the disk, in turn limits the maximum size of the disk that can be used with the renewable sleeve as compared with, for example, the size of the oblong outlet chamber when a removable sleeve is not used. The smaller volume for conducting fluid in the sleeve creates a larger pressure drop to the fluid passing through the sleeve, and thus reducing the capacity of the valve.

Moreover, in the known form of valves using renewable sleeves at the outlet chamber, the sleeve is adhered to the valve body by an adhesive, such as epoxy cement, which also is relied upon to prevent the flow of fluid between the sleeve and the valve body. When it is necessary to replace the sleeve, the valve body must be heated to a temperature sufficient to soften the epoxy so that the sleeve can be removed. Typically, it is known to heat a valve body to over 250 degrees Fahrenheit in order to effectively soften the epoxy for replacement of the sleeve.

SUMMARY OF THE INVENTION

It is an object of the present invention to provide an improved construction of a valve body for a disk valve which will reduce the cost of the valve and fluid sealing requirements.

It is a further object of the present invention to provide an improved construction for a disk valve to not only reduce or when desired produce a pressure drop to fluid emerging from a valve, but also to reduce turbulence of the fluid, and match the outlet configuration of a sleeve member at the outlet to the configuration of the valve outlet so as to avoid turbulence of the fluid in unprotected outlet areas of the valve body.

It is another object of the present invention to provide an improved construction of a sleeve member forming a discharge flow path for fluid emerging from the passageway in a disk member within a valve body wherein a chamber is formed between the disk and the valve body to carry a seal to prevent flow of fluid about the outer periphery of the disk member as well as between the sleeve and support surfaces therefore in the valve body.

According to the present invention there is provided a valve including the combination of: a unitary body having an internal cavity with an inlet and outlet for fluid; a rotator spool seated for rotational movement in the cavity of the valve body at a spaced location upstream of the fluid outlet, the inlet having a size transversely along the entire length thereof to allow introduction of the rotator spool through the inlet to the cavity in the valve body wherein the rotator spool is seated, an upstream disk locked to rotate with the rotator spool in the cavity of the valve body downstream of the rotator spool, the upstream disk having a fluid passageway for conducting fluid from the fluid passageway of the rotator spool, a downstream disk arranged in a face to face and confronting relation with the upstream disk in the cavity of the valve body, the upstream disk having a fluid passageway for conducting fluid from the opening in the upstream disk; means for interlocking the downstream disk member with the valve body; and means for rotating the rotator spool while seated in the cavity of the valve body to bring the passageway in the upstream disk and passageway in the downstream disk into and out of fluid conductor relationships.

Preferably, a removable tubular insert is interlocked with the downstream disk while supported by the valve body for conducting fluid from the opening in the downstream disk to the outlet. The tubular insert has a circular transverse cross-section with interlocking supports protruding in the circular configuration of the insert at the downstream side of the disk. Means such as pins interlock the downstream disk member with the tubular insert.

It is preferred, according to the present invention to provide that the renewable tubular insert includes an end wall with a passageway therein to meter the flow of liquid discharged from the tubular insert to the outlet of the valve body. Preferably, the rotator spool is provided with a seal restraint surface having an annular configuration and supported by the rotor spool to avoid frictional contact with a seal between the downstream disk and the valve body, while at the same time the restraint surface limits the travel for the seal in the event of, for example, a reverse fluid flow or pressure condition. The restraint surface holds the seal in place between the disk and the valve body.

BRIEF DESCRIPTION OF THE DRAWINGS

These features and advantages of the present invention as well as others will be more fully understood when read in light of the accompanying drawings in which.

DETAILED DESCRIPTION OF THE PREFERRED EMBODIMENTS

Figure 1:
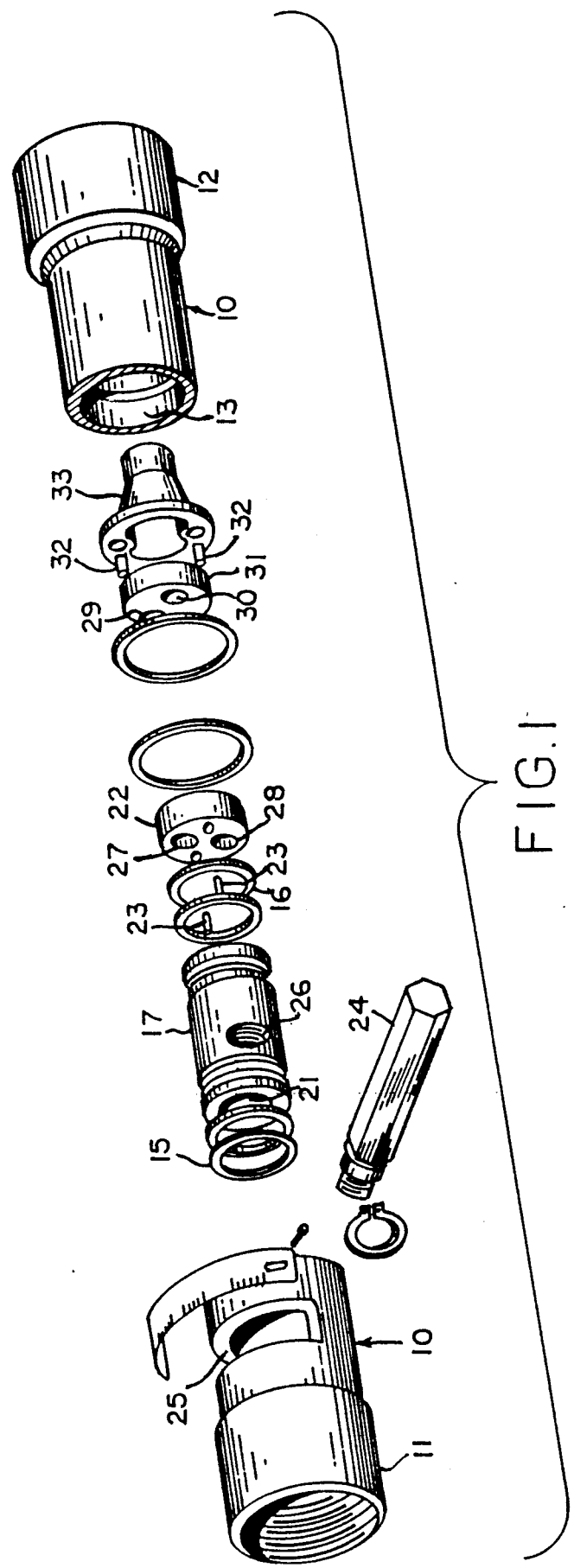
FIG. 1 is an exploded isometric view of a valve embodying features of the present invention.

In FIG. 1 there is illustrated a valve which includes a valve body 10 comprising a unitary member having an inlet portion 11 and outlet portion 12. An internal cavity in the valve body is provided by reduced diameter cylindrical cavity as most clearly seen in FIGS. 2 and 8 13 wherein fluid tight sealing is established between O-rings 15 and 16 carried by a rotor spool 17 and the cylindrical cavity 13. An important feature of the present invention arising out of the one piece construction of the valve body is that rotor spool can be removed from the valve body by first removing a control handle 24 and then withdrawing the rotor spool through the inlet portion 11. In this way, the valve body can be manufactured more economically. Moreover, the construction of the valve according to the present invention allows assembly of the internal components through the inlet, thus eliminating clamping together flanges in a fluid tight manner as required when the valve body is made up of two valve body parts as is a conventional valve body. The inlet portion 11 is formed by an enlarged hub 18 having internal threads for receiving a corresponding threaded end portion of a pipe. Similarly, outlet portion 12 is formed by an enlarged hub 19, having an internally threaded portion which can receive a pipe for the discharge of fluid from the valve.

Figure 2:
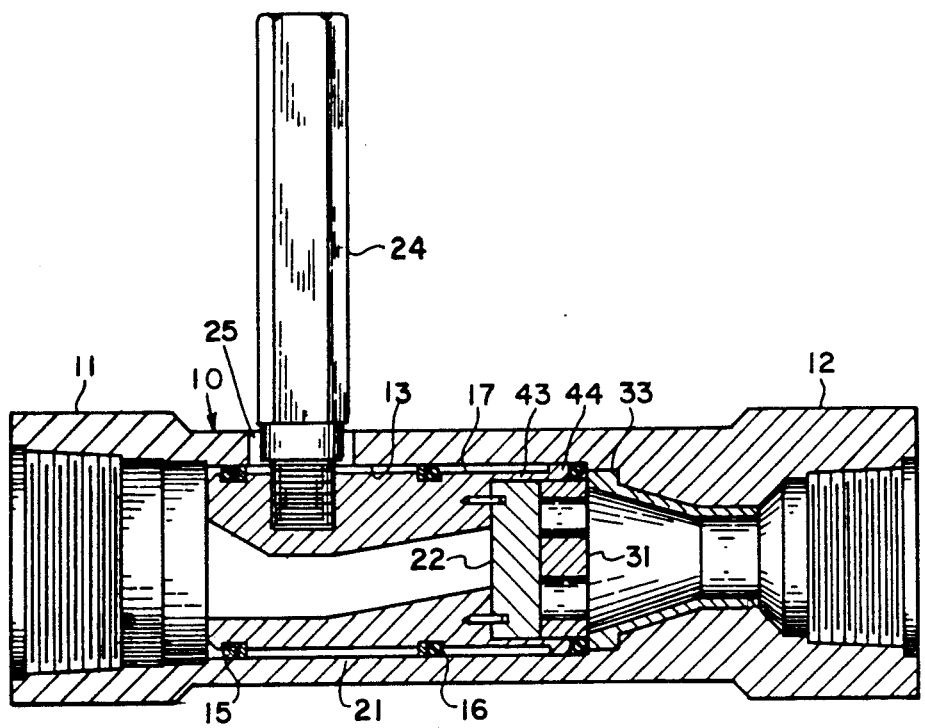
FIG. 2 is a sectional view showing the assembly of parts illustrated in FIG. 1 forming the valve of the present/invention.

As can be best seen in FIG. 2, the inlet 11 extends to the cylindrical cavity 13. The rotor spool 17 is positioned in the cylindrical cavity 13, and the O-rings 15 and 16 are mounted in grooves formed in the rotor spool near the terminal ends thereof to form a fluid tight seal with the valve body and prevent the passage of fluid between the rotor spool and the valve body. Fluid supplied to the valve from the inlet can pass through a passageway 21 in the rotor spool 17. In this embodiment, the passageway 21 extends in the longitudinal direction along the length of the spool. At the end of the spool which faces toward the outlet 12, the cavity 13 extends beyond the end of the spool. A floating disk 22 is drivingly interlocked with the rotor spool by pins 23 which extend into openings in the disk 22 and openings in the end face of rotor spool. The spool can be rotated by the control handle 24, which is provided with a threaded end portion that can pass through an annular slot 25 in valve body 10, where the threaded end portion of handle 24 engages in a threaded opening 26 formed in the spool 17 to retain the spool in the cylindrical cavity 13 of valve body 10. It will be observed that the slot 25 is situated along the valve body between the support sites for the two O-rings. By rotating the spool through operation of the handle, the spool rotates about an axis corresponding to the longitudinal axis of the cylindrical shaped rotor spool.

Figure 4:
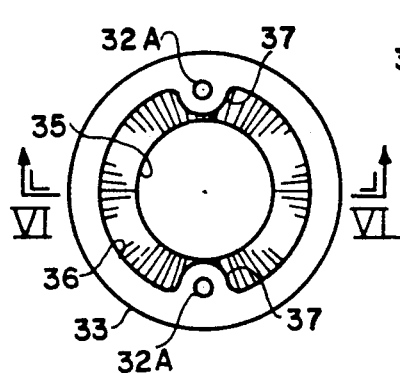
FIG. 4 is a front plan view of the sleeve member shown in FIG. 3.

The rotation of the spool imparts a rotary movement to the disk 22 such that in the embodiment shown in FIGS. 1 and 2, openings 27 and 28 of disk 22 can be moved into and out of alignment or registration with corresponding openings 29 and 30 in a disk 31. The disk 31 is held in a stationary manner relative to the valve housing by anchor pins 32, which, as best shown in FIG. 1, are received in drilled openings formed in the disk 31 and other openings 32a aligned therewith and formed in a replaceable sleeve 33 or when such a sleeve is not utilized, the drilled openings are provided in a ledge surface formed by a reduced step in the diameter of the opening in the valve body. The sleeve is assembled into the valve body by passing the sleeve through the inlet opening and the cylindrical cavity 13. The replaceable sleeve 33 is preferably used and can be embodied as shown in FIGS. 3-6. The sleeve is made up of an annular discharge section 35 of which upstream thereof is a generally truncated conical section 36. The section 36, as can be best seen in FIG. 4, is provided with protruding sections 37 that extend into the conical configuration of the sleeve at the fluid entrance end thereof. These protruding sections form sites where holes 32A are formed to hold anchor pins 32. The transverse area of the sleeve along its length is maximized for capacity to carry the largest possible volume of fluid discharged from the valve. In this way, a lower pressure drop is largely responsible due to the taper provided by the truncated conical portion of the sleeve. The taper reduces turbulence and the tubular outlet of annular discharge section 35 of sleeve 33 is designed to match the outlet of the valve body to prevent unwanted turbulence int he unprotected or unlined portion of the valve body.

Figure 3:
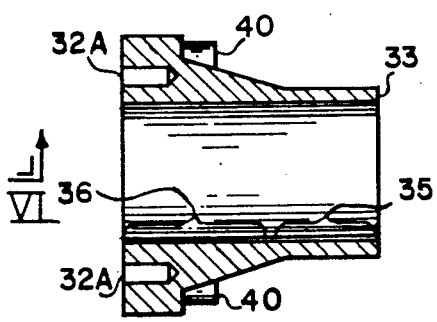
FIG. 3 is a transverse sectional view of a sleeve member at the discharge chamber of the valve shown in FIGS. 1 and 2.
Figure 5:
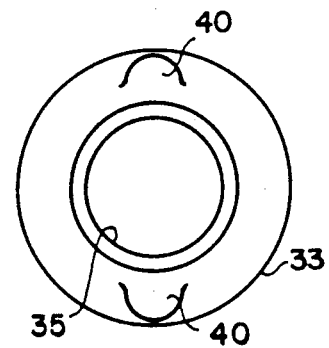
FIG. 5 is a rear plan view of the sleeve shown in FIG. 3.
Figure 6:
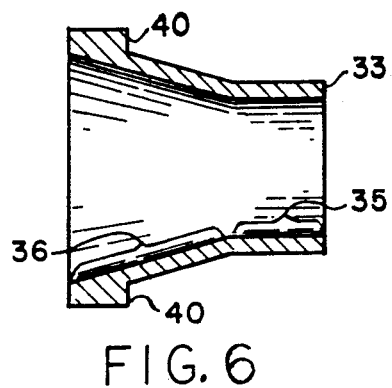
FIG. 6 is a sectional view taken along lines VI—VI of FIG. 4.

As can be seen from FIGS. 3, 5, and 6, on the outside of the sleeve 33 there are provided anchor lugs 40 at diametrically opposite sides of the sleeve. The anchor lugs are protrusions on the outside surface of the sleeve which interlock with recesses best shown in FIG. 2, formed int he sleeve seating surface of valve body at the discharge outlet side of the disk 31. The sleeve of the present invention is designed to avoid and eliminate the need for epoxy or other adhesive to hold the sleeve to the valve body. The sleeve 33 is retained against the seating surface in the valve body by pressure of the fluid exerted on the valve body at the inlet end. It can be seen from FIG. 2 that the pressure of the fluid applied to the spool whether in a position for delivering fluid to the discharge portion or not, undergoes a pressure drop due to the smaller passageway for fluid through the spool. The pressure differential, or pressure of fluid blocked by the disks applies a force sufficient to hold the disks in their confronting face-to-face relation, and, at the same time, press the sleeve against the valve under a sufficient force to maintain a seated relationship.

Figure 7:
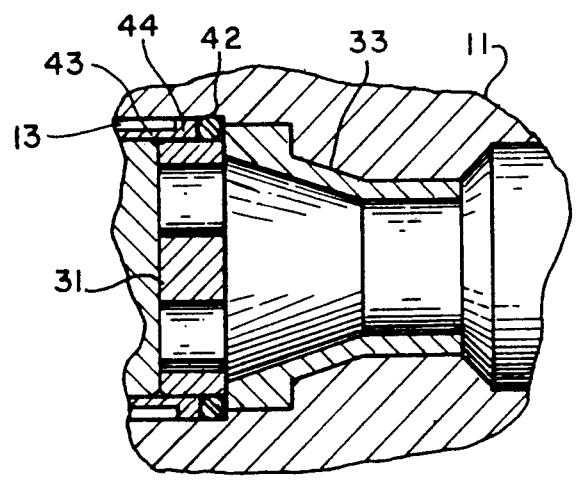
FIG. 7 is an enlarged view in section to illustrate the relationship between a downstream disk and the sleeve shown in FIGS. 3-6.

As best shown in FIG. 7, in order to prevent unwanted flow of fluid between the sleeve and the valve housing, there is provided an O-ring 42 which is seated in a gap formed between the outer circumferential face surface of disk 31 and the wall of the valve housing. The relationship of the O-ring is such that the O-ring is seated at the parting line between the sleeve 33 and the valve seating surface of the housing.

Figure 8:
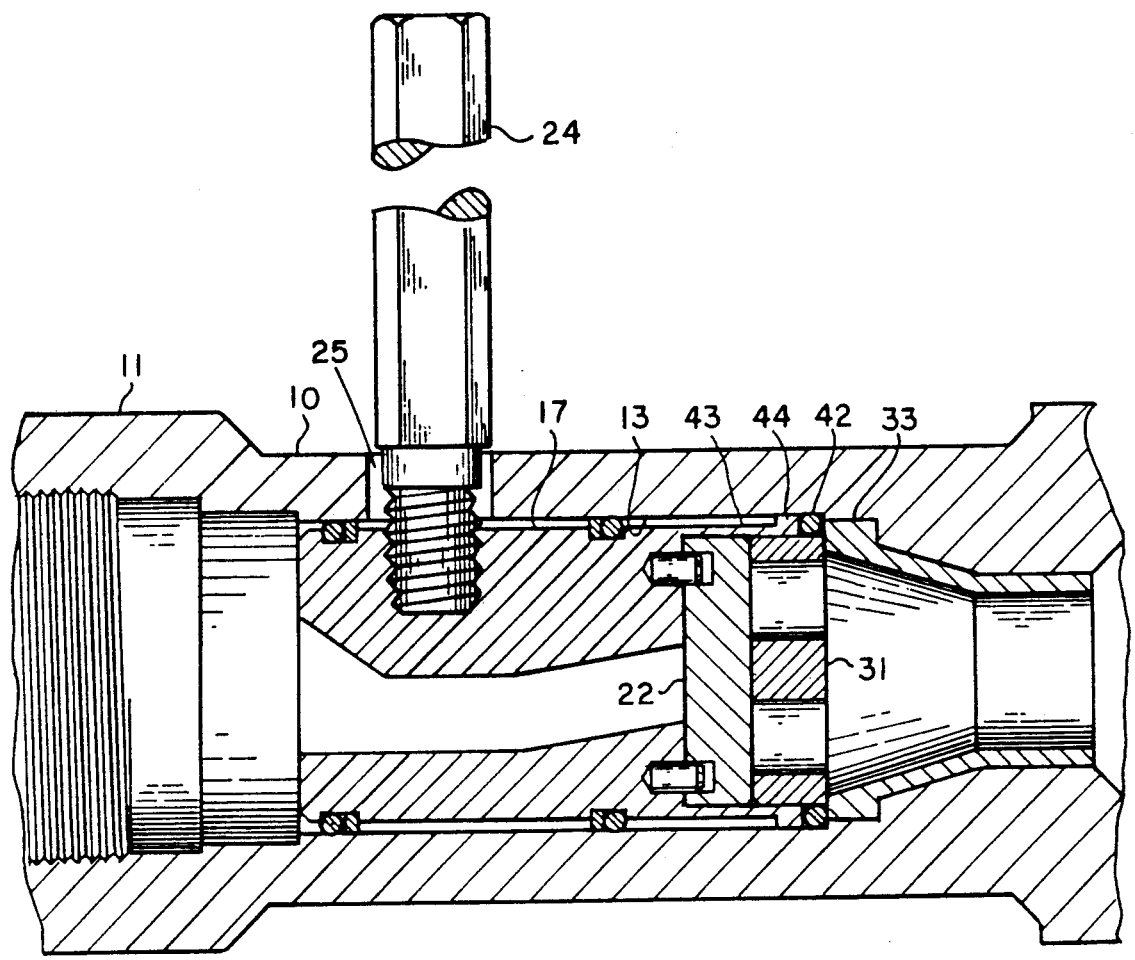
FIG. 8 is an enlarged view similar to FIG. 2, but illustrating a preferred embodiment of the rotor spool for the valve of the present invention.

In a preferred embodiment of the present invention, as shown in FIG. 8, the O-ring 42 is retained in close proximity to its desired sealing site by a cylindrical extension 43 to the rotator spool 17. The cylindrical section 43 is provided with a relatively thin wall section having at its terminal end a thickened restraint section 44 which is an enlargement on the outside diameter of section 43. The end face of restraint section 44 is sufficiently broad to entrap the O-ring 42 and prevent unwanted displacement of the O-ring away from its intended sealing site. The extension of the rotor spool serves further to facilitate assembly of the valve by holding the disks 22 and 31 in their confronting face-to-face relationship with the upstream disk 22 being locked by the pins 23 to the rotor spool. In the normal operation of the valve, the inlet pressure is higher than the outlet pressure, thus allowing fluid to flow from the inlet to the outlet. The flow is controlled by the relative positions of the openings 27, 28 and 29, 30 in the two disks. The O-ring 42 is held in place by friction and differential pressure urging the O-ring toward the low pressure side of the valve. In the past, sudden changes in the downstream conditions for the fluid, such as a valve closing or a sudden drop in flow conditions will cause a hydraulic hammer, resulting in a momentary pressure pulse in the outlet that is higher than the fluid pressure in the inlet. This pressure pulse can be large enough, in some instances, to unseat the seal provided by the O-ring 42. Once the O-ring sealing has been disrupted, the normal operation of the valve will allow a fluid flow, although small, between the disk sidewalls and the cavity formed in the valve body. The material used to form the valve body normally cannot withstand the abrasive cutting action caused by the by-pass flow of fluid and thus, irreparable damage will occur. In other instances, a deliberate back-flush of fluid is caused to occur for any one of numerous reasons. Hence, there is established a flow of fluid through a valve in a reverse direction, i.e., outlet to inlet, the result is the same as the result produced by a hydraulic hammer. To correct this, the extension to the rotor spool, as described above, avoids the unseating of the sealing O-ring 42. The restraint established by the end wall 44 can be provided by dimensioning the thin wall section 43 to prevent rubbing or friction during adjustment of the valve for normal operation and to form a limit of travel for the O-ring 42. If a reverse flow or pressure change in the reverse direction occurs, the sealing O-ring 42 moves only as far as allowed by the restraint provided by the wall 44 extended from to the rotor spool. The extent of movement is such that the O-ring 42 is retained in place between the disk and the valve body so that when normal pressure flow conditions are restored to the valve, the O-ring immediately assumes its proper sealing relationship. Provision of an extension to the rotor spool offers the further advantage that the O-ring 42 which must be wedged tightly in place, uniformly about the periphery of the disk can be achieved without the need for special implements. In the past when the O-ring 42 was placed in the sealing site, it was common to wedge the O-ring through the use of a pointed blade, such as a screw driver. Good uniform seating of the O-ring could not be achieved. However, with the provision of the extension to the spool, an automatic continuous seating of the O-ring is provided. It is to be understood, however, that the retention function of the cylindrical extension of the spool can be achieved by providing, for example, an extension to the valve body arranged to protrude into the opening formed in housing for receiving the disks.

While the present invention has been described in accordance with the preferred embodiments of the various figures, it is to be understood that other similar embodiments may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

I claim:
1. A valve including the combination of:
   a one-piece body having an internal cavity with an inlet and outlet for fluid;
   a rotator spool seated for rotational movement in the cavity of said valve body at a spaced location upstream of the fluid outlet, said inlet being sized to allow introduction of said rotator spool through the inlet to the cavity in the valve body wherein the rotator spool is seated, said rotator spool having a fluid passageway;
   an upstream disk locked to rotate with said rotator spool in the cavity of said valve body downstream of said rotator spool, said upstream disk having a fluid passageway for conducting fluid from the fluid passageway of said rotator spool;

a downstream disk arranged in a face to face and confronting relation with said upstream disk in the cavity of said valve body, said downstream disk having a fluid passageway for conducting fluid from the fluid passageway in said upstream disk;

means for interlocking said downstream disk member with said valve body; and means for rotating said rotator spool while said rotator spool is seated in the cavity of the valve body to bring the passageway in the upstream disk and the passageway in the downstream disk into and out of fluid conducting relationship.

2. The valve according to claim 1 further including a tubular insert interlocked with said downstream disk while supported by said valve body for conducting fluid from the passageway in the downstream disk to said outlet, said tubular insert having a circular transverse cross section with interlocking means protruding into the circular transverse cross section of the insert and into the downstream disk; and means for preventing rotation of the tubular insert relative to a mating support surface formed by said valve body.

3. The valve according to claim 2 wherein said tubular insert includes a cylindrical fluid discharge portion and upstream thereof a truncated conical portion for receiving fluid from said downstream disk, said truncated portion having protruding lug sections extending from the wall of the spool and forming anchor sites for said means for preventing rotation.

4. The valve according to claim 2 wherein said tubular insert includes an end wall at a fluid discharge end thereof, said end wall having an opening therein for conducting fluid to said outlet.

5. The valve according to claim 1 further including means for preventing flow of fluid between said tubular insert and said valve body.

6. The valve according to claim 5 wherein said mean for preventing flow of fluid includes an O-ring.

7. The valve according to claim 6 further including means for preventing dislodgment of said O-ring from a seated sealing condition between the valve body and the tubular insert.

8. The valve according to claim 7, wherein said means includes a wall section projecting from said rotator spool.

9. The valve according to claim 1 wherein said means for rotating said rotator spool comprise handle means which are releasably attachable to said rotator spool, said handle means further serving to retain said rotator spool in said cavity when said handle means is attached to said rotator spool.

10. The valve according to claim 9 wherein said body has an elongated slot formed therein extending substantially transversely to a central longitudinal axis of said body, said handle means being releasably attachable to said rotator spool through said elongated slot.

* * * * *